G. L. PATTERSON.
BATTERY AND HOLDER.
APPLICATION FILED MAY 26, 1908.
924,574.
Patented June 8, 1909.
2 SHEETS—SHEET 1.
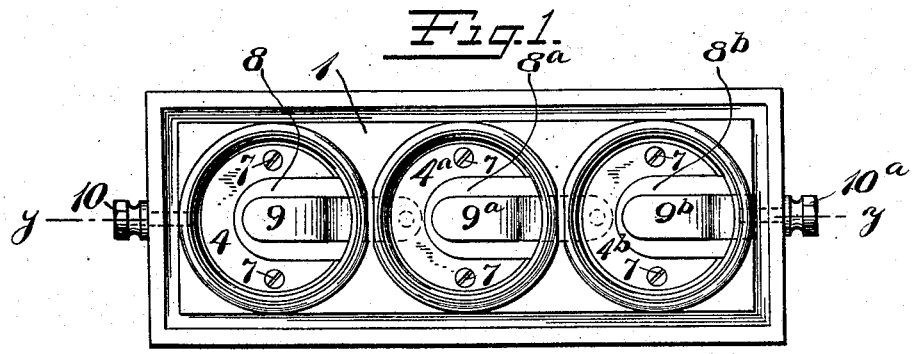
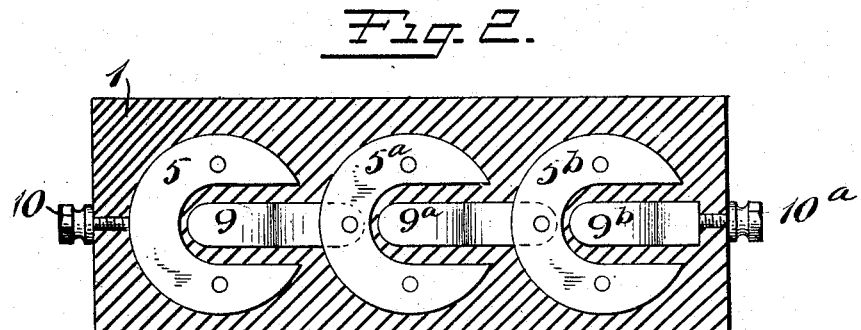
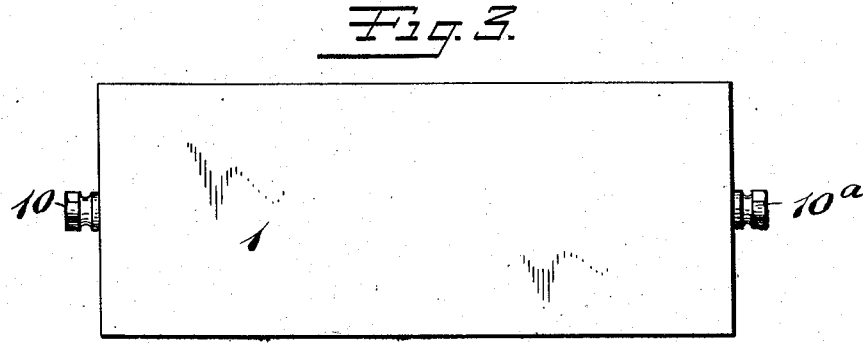
Witnesses:
Inventor
G. L. PATTERSON
By his Attorneys

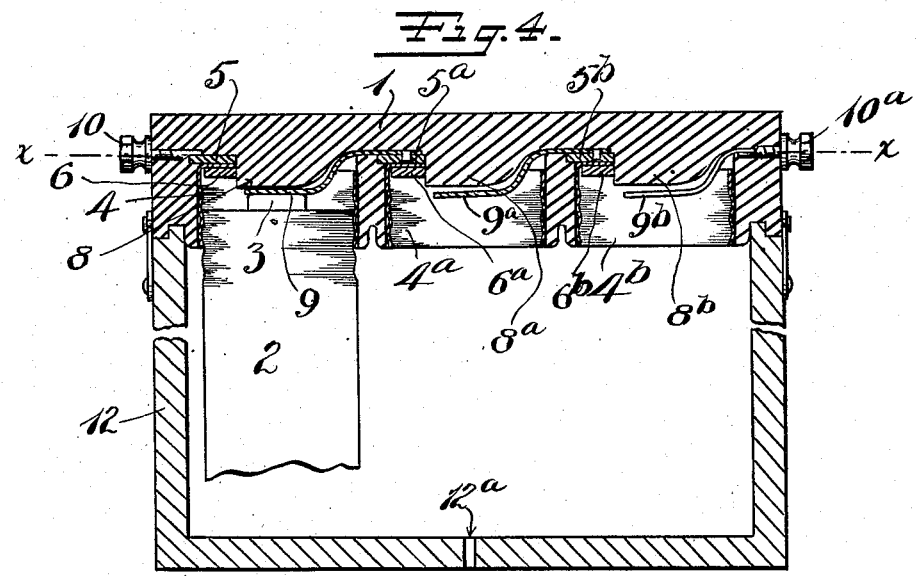

UNITED STATES PATENT OFFICE.

GEORGE LEWIS PATTERSON, OF NEW YORK, N. Y., ASSIGNOR TO ALICE C. PATTERSON, OF NEW YORK, N. Y.

BATTERY AND HOLDER.

No. 924,574.　　　Specification of Letters Patent.　　　Patented June 8, 1909.

Application filed May 26, 1908. Serial No. 435,126.

*To all whom it may concern:*

Be it known that I, GEORGE LEWIS PATTERSON, a citizen of the United States, residing at New York, New York, have invented certain new and useful Improvements in Batteries and Holders, of which the following is a full, clear, and exact description.

My invention relates to certain new and useful improvements in batteries and holders therefor.

The invention is mainly an improvement on the structure described and claimed in U. S. Letters Patent to Gill, No. 705,919, of July 29, 1902, the present invention providing improved features of mechanical construction, whereby superior electrical connections are effected, and whereby the battery cells are held against working loose by vibration. This and other advantages will be apparent to the mechanic skilled in the art from a reading of the following description.

In the drawings, Figure 1 is a view of the under side of the insulated head or cell carrier; Fig. 2 is a section thereof on the plane of the line $x-x$ of Fig. 4; Fig. 3 is a plan view thereof; Fig. 4 is a section on the plane of the line $y-y$ of Fig. 1, of the entire carrier and battery container with one cell (broken away) in place; Fig. 5 is a side view of a detached detail; Fig. 6 is a plan view of another detail; Fig. 7 is a side elevation of the detail shown in Fig. 6; Fig. 8 is a view of a modification; Fig. 9 is an edge view of the same modification.

In the drawings I have shown the preferred form of construction, in which 1 represents the head, preferably of suitable insulating material and preferably, in the main, of a molded insulated compound.

2 represents a single cell unit shown in place in Fig. 4. This cell unit 2 is of the improved type set forth in the aforesaid Gill patent. The upper end of this cell 2 is screw-threaded for the purpose hereinafter described, while the central electrode 3 is exposed at the upper end within the cupped body of the cell.

4—4$^a$—4$^b$ are threaded terminal sockets carried by the head 1 and insulated from each other.

5—5$^a$—5$^b$ are bed-plates of U-shaped outline and anchored or embedded in the head 1, so as to be rigidly carried thereby.

6—6$^a$—6$^b$ are reinforcing members shaped substantially to the outline of the members 5—5$^a$—5$^b$, but smaller, so as to fit within each of the sockets 4—4—4$^a$—4$^b$, respectively to reinforce the bottom and to afford a suitable abutment to receive the heads of fastening screws 7, by which the sockets 4—4$^a$—4$^b$ may be securely fastened to the bed-plates 5—5$^a$—5$^b$, respectively. The bottom of each socket is cut away to correspond with the openings in the sides of the members 5—6, these openings registering when the parts are assembled. This arrangement is provided so as to afford ample space for contact supports 8—8$^a$—8$^b$ of insulating material, the function of which will later be explained. Each of these contact supports may be and preferably is formed integrally with the insulating head 1. 9—9$^a$—9$^b$ are terminal contact members electrically connected, respectively, to bed-plates 5—5$^a$—5$^b$. These contacts 9—9$^a$—9$^b$ are adapted to electrically connect with the center electrodes 3 of the cells.

10—10$^a$ are two binding posts.

The contacts 9—9$^a$—9$^b$ stand adjacent to the contact supports 8—8$^a$—8$^b$ and normally slightly away therefrom, said contacts being preferably formed of spring material.

12 is a closure or box-like receptacle arranged to close in the under side of the head 1, the latter acting as a cover therefor, whereby the cells 2 are completely housed in and protected.

12$^a$ is a lower vent. Any suitable means for connecting the head cover 1 to the box-like closure 12 may be employed to seal the line of division, thereby absolutely preventing rain or dirt from entering the box. The vent 12$^a$ permits the escape of any gases that may be generated. By this arrangement, a holder of this type is particularly adapted for automobile or boat use. For some uses the box 12 may be eliminated, for example, household use.

From the foregoing it will be seen, that when a battery cell 2 is inserted, the upper end of the same is screwed into its respective socket 4—4$^a$—4$^b$. When screwed in sufficiently far enough, the central terminal of the particular cell engages one of the contacts 9—9$^a$ or 9$^b$. As the user continues to screw in the cell this terminal will be forced back until it seats upon its respective support 8—8$^a$ or 8$^b$. From then on a resistance is offered whereby the cell 2, by continued turning, may be securely clamped or locked in place by the frictional engagement between its threads and the screw-threads of the socket, thus preventing accidental separation of said parts. This is not the only advantage of the insulated contact supports 8ª—8ᵇ, for, as will be seen, the screwing in of each cell with its central terminal bearing against the rigidly supported contact will cause said parts to rub together so tightly as to wear away any corrosion or dirt which would otherwise tend to impair the free flow of current.

Each screw socket 4—4ª—4ᵇ being one of the terminals, it follows that a very superior electrical connection is afforded, as well as a mechanical connection. If, for any cause, one of the sockets 4—4ª or 4ᵇ should become damaged, for example, by the wearing out of threads or by oxidization, a new socket may be readily introduced by simply removing the screws 7, releasing the plate 6, whereupon the socket may be readily slipped out and a new one introduced at comparatively no expense and very little trouble.

In the modification shown in Figs. 8 and 9, I have illustrated a circuit closer arrangement whereby, when one or more battery cells are removed, the circuit will be closed through the fixed terminals, thus permitting the other cells to continue in use without interruption. This closure comprises merely a member 14, which, as shown, is attached to the removable reinforcing plate 6, which plate is otherwise the same as shown in the other figures. This closer 14 hooks under, or extends under, the end of the spring contact 9ᶜ, which corresponds in construction and function to the spring contacts 9—9ª—9ᵇ, excepting that it is somewhat longer to coöperate with the closer 8. When no battery cell is present, the member 9ᶜ engages the closer 14, thus short-circuiting the terminals of the particular socket from which the cell is removed, permitting any other cells that may be in other sockets to continue their function.

When a cell is introduced the central terminal thereof moves the spring contact 9ᶜ so that its end will be freed from the closer 14 so long as the cell is in place, whereupon the circuit will then pass through this battery cell in the same manner as shown in Fig. 4.

While I have shown in the drawings the sockets arranged in line, it is obvious that they might readily be arranged side by side so that any number of sockets might be employed either in one row or in parallel rows.

What I claim is:

1. A socket or battery holder including a head, two terminal pieces carried thereby and secured thereto, one of said terminal pieces being screw-threaded, the other terminal piece being located within the screw-threaded terminal piece, and means for detachably securing said screw-threaded terminal piece to said head including a bed plate of conducting material rigidly secured in said head.

2. A socket or battery holder including a head, two terminal pieces carried thereby and secured thereto, one of said terminal pieces being screw-threaded, the other terminal piece being located within the screw-threaded terminal, means for detachably securing said screw-threaded terminal piece to said head including a bed plate of conducting material rigidly secured in said head, and an insulated support for the other terminal piece to limit the movement of said terminal piece in one direction.

3. In a battery holder, a head, a current carrying bed plate fixed therein, a screw-threaded socket terminal detachably secured to said bed plate, and a second terminal located within but insulated from the threaded socket terminal and carried by said head.

4. In a battery holder, a head, a current carrying bed plate fixed therein, a screw-threaded socket terminal detachably secured to said bed plate, a second terminal located within but insulated from the threaded socket terminal and carried by said head, and an insulating support for the inner end of the last mentioned terminal.

5. In a device of the character described, a battery cell carrier comprising a head of insulating material, a current carrying bed plate embedded therein, a socket for receiving a battery cell, said socket being detachably carried by said bed plate and electrically connected therewith, one of said parts having a clearance space and a second terminal arranged in said clearance space and adapted to co-act with a cell when the latter is in place.

6. In a device of the character described, a battery cell carrier comprising a head of insulating material, a bed plate rigidly carried thereby and constituting a part of one terminal, a socket constituting a part of the same terminal, and means for detachably connecting the same to said bed plate.

7. In a device of the character described, a battery cell carrier comprising a head of insulating material, a bed plate rigidly carried thereby and constituting a part of one terminal, a socket constituting a part of the same terminal, and means for detachably connecting the same to said bed plate, including a removable reinforcing member arranged within said socket and operating to clamp said socket against said bed plate.

8. A holder for electric cells comprising a support, a plurality of cell circuit connectors carried thereby, one of said connectors including a cell-holding socket, and a laterally projecting conductor member extending from said socket into the open center of an adjacent socket, a portion of said member being resilient.

9. A holder for electric cells including two cell-receiving sockets of conducting material, each operating as similar terminals for two separate cells, a resilient conductor member electrically connected with one of said sockets and extending laterally therefrom into the open center of the adjacent socket and constituting the opposite terminal of the last mentioned socket.

10. A battery holder including a socket having two terminal pieces, one of said socket terminal pieces being arranged to receive and hold a battery cell, the other terminal being electrically connected with said first mentioned terminal and extending laterally therefrom to constitute the opposite terminal piece of an adjacent socket.

11. In a battery holder, a head, a plurality of sockets each arranged to embrace and hold a battery cell, each of said sockets being constructed to constitute one terminal for its respective cell, one or more of said sockets having a contact terminal projecting laterally therefrom into the field of an adjacent socket to constitute the opposite terminal for a cell arranged to be carried by the last mentioned socket.

12. In a battery holder for dry battery cells, a support, a plurality of metallic cell-receiving and holding sockets arranged to make electrical connection with corresponding cell terminals, each socket having a laterally projecting metallic connection extending therefrom to the center of another socket but spaced therefrom when a cell is in place therein to constitute the opposite terminal connector for such cells.

13. An electrical connector for a plurality of electric cells comprising one conducting member having cell-holding means arranged to make connection with one electrode of a dry battery cell, and a second conducting member extending laterally from said first conducting member to connect with the opposite pole of an adjacent cell.

GEORGE LEWIS PATTERSON.

Witnesses:
R. C. MITCHELL,
R. W. PAWREL.